(12) United States Patent
Pei

(10) Patent No.: US 11,215,315 B2
(45) Date of Patent: Jan. 4, 2022

(54) DISPLAY MOUNTING DEVICE

(71) Applicant: Jun Ma, Shenzhen (CN)

(72) Inventor: Xubo Pei, Shenzhen (CN)

(73) Assignee: Jun Ma, Guangdong (CN)

( * ) Notice: Subject to any disclaimer, the term of this patent is extended or adjusted under 35 U.S.C. 154(b) by 0 days.

(21) Appl. No.: 17/040,414

(22) PCT Filed: Apr. 25, 2019

(86) PCT No.: PCT/CN2019/084387
§ 371 (c)(1),
(2) Date: Sep. 22, 2020

(87) PCT Pub. No.: WO2020/215290
PCT Pub. Date: Oct. 29, 2020

(65) Prior Publication Data
US 2021/0010632 A1     Jan. 14, 2021

(51) Int. Cl.
*F16M 11/08*    (2006.01)
*F16M 11/04*    (2006.01)
*F16M 13/02*    (2006.01)

(52) U.S. Cl.
CPC ........... *F16M 11/08* (2013.01); *F16M 11/048* (2013.01); *F16M 13/022* (2013.01); *F16M 2200/066* (2013.01)

(58) Field of Classification Search
CPC .... F16M 11/08; F16M 11/048; F16M 13/022; F16M 2200/066; F16M 11/10;
(Continued)

(56) References Cited

U.S. PATENT DOCUMENTS

| 7,345,870 B2 * | 3/2008 | Shin | F16M 11/10 361/679.27 |
| 8,693,172 B2 * | 4/2014 | Russell | F16M 11/2014 361/679.01 |

(Continued)

FOREIGN PATENT DOCUMENTS

| CN | 2816557 Y | 9/2006 |
| CN | 202001800 U | 10/2011 |

(Continued)

OTHER PUBLICATIONS

International Search Report for related PCT application serial No. PCT/CN2019/084387, filed on Apr. 25, 2019.

*Primary Examiner* — Muhammad Ijaz
(74) *Attorney, Agent, or Firm* — Fish IP Law LLP

(57) ABSTRACT

The present disclosure provides a display mounting device, including a wall panel, an expansion hinge connection rod assembly, an adapter bracket, and a display bracket. The wall panel includes a main frame, two upper extension rods, and two lower extension rods. The main frame includes an upper beam, a lower beam, and a bearing plate. The two upper extension rods are respectively rotatably coupled to two ends of the upper beam to allow the two upper extension rods to be unfolded or folded relative to the upper beam. The lower extension rods are respectively rotatably coupled to two ends of the lower beam to allow the two lower extension rods to be unfolded or folded relative to the lower beam. Upper extension rods and lower extension rods can be folded and unfolded relative to the upper beam and the lower beam, thus meeting requirements of packaging size and installation size.

20 Claims, 4 Drawing Sheets

(58) Field of Classification Search
CPC ............. F16M 11/2092; F16M 11/041; F16M 2200/06; F16M 13/02
USPC ............ 248/201, 286.1, 298.1, 277.1, 276.1, 248/288.11
See application file for complete search history.

(56) References Cited

U.S. PATENT DOCUMENTS

| | | | | |
|---|---|---|---|---|
| 8,746,635 | B2* | 6/2014 | Kim | H04N 5/64 |
| | | | | 248/133 |
| 10,969,056 | B2* | 4/2021 | Pei | F16M 11/04 |
| 2005/0236543 | A1 | 10/2005 | O'Neil | |
| 2010/0006725 | A1* | 1/2010 | Kim | F16M 11/10 |
| | | | | 248/222.51 |
| 2010/0309615 | A1* | 12/2010 | Grey | F16M 11/24 |
| | | | | 361/679.01 |
| 2014/0091187 | A1* | 4/2014 | Stenhouse | F16M 13/02 |
| | | | | 248/284.1 |
| 2019/0390817 | A1* | 12/2019 | Pei | F16M 11/10 |
| 2020/0340614 | A1* | 10/2020 | Pei | F16M 11/08 |
| 2021/0010632 | A1* | 1/2021 | Pei | F16M 13/02 |

FOREIGN PATENT DOCUMENTS

| | | |
|---|---|---|
| CN | 204534053 U | 8/2015 |
| CN | 204906915 U | 12/2015 |
| CN | 206274115 U | 6/2017 |
| CN | 107120508 A | 9/2017 |
| GB | 2460405 A | 12/2009 |

* cited by examiner

DISPLAY MOUNTING DEVICE

CROSS-REFERENCE TO RELATED APPLICATION

This application is a continuation of PCT/CN2019/084387, filed on Apr. 25, 2019, the disclosure of which is hereby incorporated by reference in its entirety.

TECHNICAL FIELD

The present disclosure relates to a technical field of a mounting device, more particularly relates to a display mounting device.

BACKGROUND

At present, overall sizes of display mounting brackets are relatively large, such that the existing display mounting brackets cannot meet packaging requirements. However, reducing the overall sizes of the display mounting brackets can meet the packaging requirements, but the display mounting brackets cannot meet installation requirements, thus resulting in restrictions on the installations of the display mounting brackets. Therefore, structures of the existing display mounting brackets have problems of difficulty in installation and packaging.

SUMMARY

The present disclosure provides a display mounting device to overcome defects of the prior art.

The present disclosure provides a display mounting device, including a wall panel, an expansion hinge connection rod assembly, an adapter bracket, and a display bracket. The wall panel includes a main frame, two upper extension rods, and two lower extension rods. The main frame includes an upper beam, a lower beam arranged opposite to the upper beam, and a bearing plate fixed between the upper beam and the lower beam. The two upper extension rods are respectively rotatably coupled to two ends of the upper beam to allow the two upper extension rods to be unfolded or folded relative to the upper beam. Each of the two upper extension rods defines an upper mounting hole. The upper mounting hole is configured for a screw passing through to allow the two upper extension rods to be fixed to a wall or a load bearing column. The lower extension rods are respectively rotatably coupled to two ends of the lower beam to allow the two lower extension rods to be unfolded or folded relative to the lower beam. Each of the two lower extension rods defines a lower mounting hole. The lower mounting hole is configured for a screw passing through to allow the two lower extension rods to be fixed to the wall or the load bearing column. One end of the expansion hinge connection rod assembly is coupled to the bearing plate. The adapter bracket is coupled to one end of the expansion hinge connection rod assembly far away from the bearing plate. The display bracket is coupled to the adapter bracket to allow the display bracket to expand and contract relative to the wall panel along with the adapter bracket and the expansion hinge connection rod assembly.

The present disclosure provides the display mounting device. The main frame includes an upper beam, a lower beam arranged opposite to the upper beam, and a bearing plate fixed between the upper beam and the lower beam. The two upper extension rods are respectively rotatably coupled to two ends of the upper beam. Each of the two upper extension rods defines an upper mounting hole. The lower extension rods are respectively rotatably coupled to two ends of the lower beam. Each of the two lower extension rods defines a lower mounting hole. Therefore, the upper extension rods and the lower extension rods can be folded respectively relative to the upper beam and the lower beam, meeting requirements of packaging size. The upper extension rods and the lower extension rods can be unfolded respectively relative to the upper beam and the lower beam, thus meeting requirements of installation size. The display mounting device solves problems of difficulty in installation and packaging.

BRIEF DESCRIPTION OF THE DRAWINGS

In order to more clearly illustrate the technical solution in the embodiments of the present disclosure, the accompanying drawings required for describing the embodiments will be briefly described below. Obviously, the accompanying drawings in the following description are merely the embodiments of the present disclosure, and other obvious modifications of these drawings may be obtained by those skilled in the art according to these accompanying drawings without paying any creative labor.

DETAILED DESCRIPTION

The technical solution of the embodiments of the present disclosure will be briefly described below in conjunction with the accompanying drawings of the embodiments of the present disclosure. Obviously, the described embodiments are only a part of the embodiments of the present disclosure, not all of the embodiments. Based on the embodiments of the present disclosure, all other embodiments obtained by those of ordinary skill in the art without paying any creative labor are within the scope of protection of the present disclosure.

It should be noted that, when a component is referred to as being "fixed to" another component, the component can be directly fixed to the another component or fixed on the another component by an intermediate component. When a component is referred to as being "coupled to" another component, the component can be directly connected to the another component or connected to the another component by an intermediate component.

Unless otherwise defined, all technical and scientific terms used herein have the same meaning as commonly understood by those skilled in the technical field of the present disclosure. The terms used in the description of the present disclosure herein are only for the purpose of describing specific embodiments, and is not intended to limit the present disclosure. The terms "and/or" used herein includes any and all combinations of one or more related listed items.

Some embodiments of the present disclosure will be described in detail below in conjunction with the drawings. In the case of no conflict, the following embodiments and features in the embodiments can be combined with each other.

Figure 1:
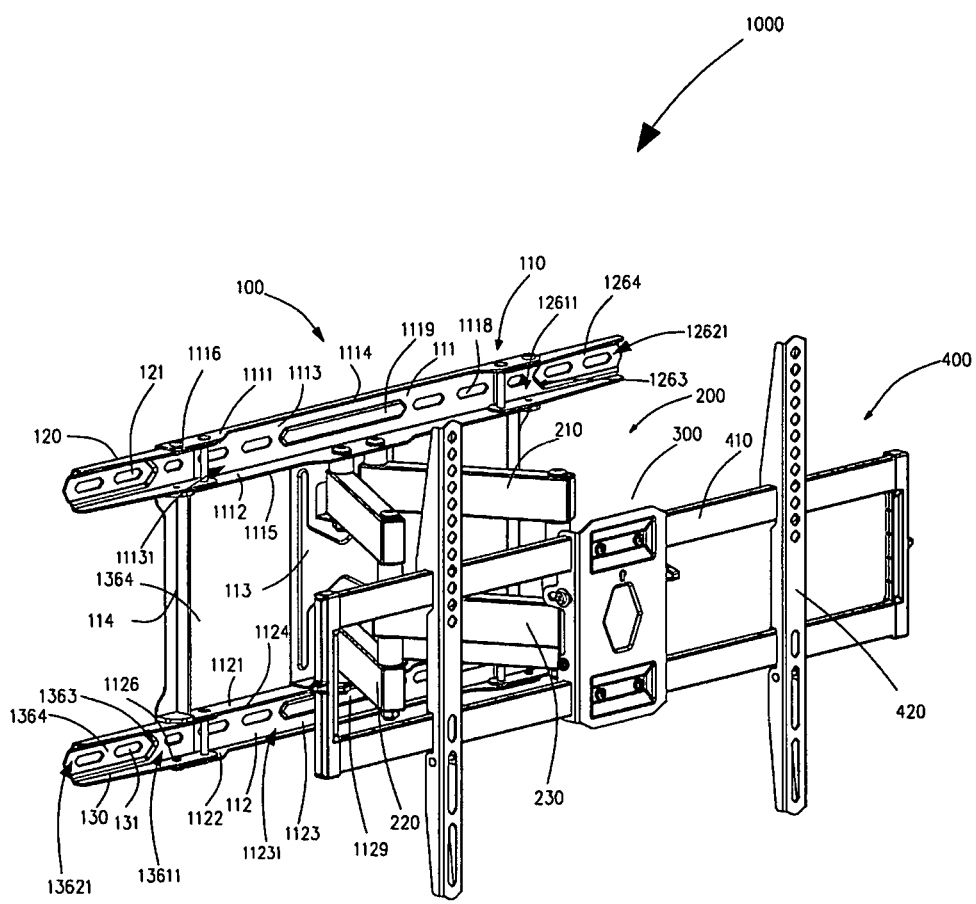
FIG. 1 is a schematic view of a display mounting device provided by the present disclosure.
Figure 2:
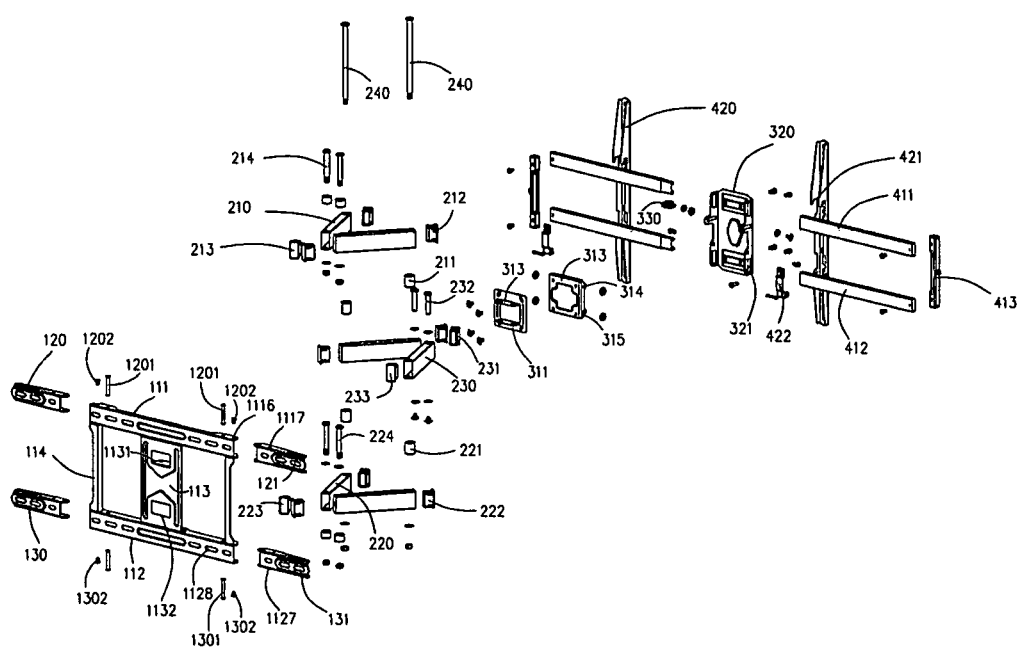
FIG. 2 is an exploded schematic view of the display mounting device of FIG. 1.
Figure 3:
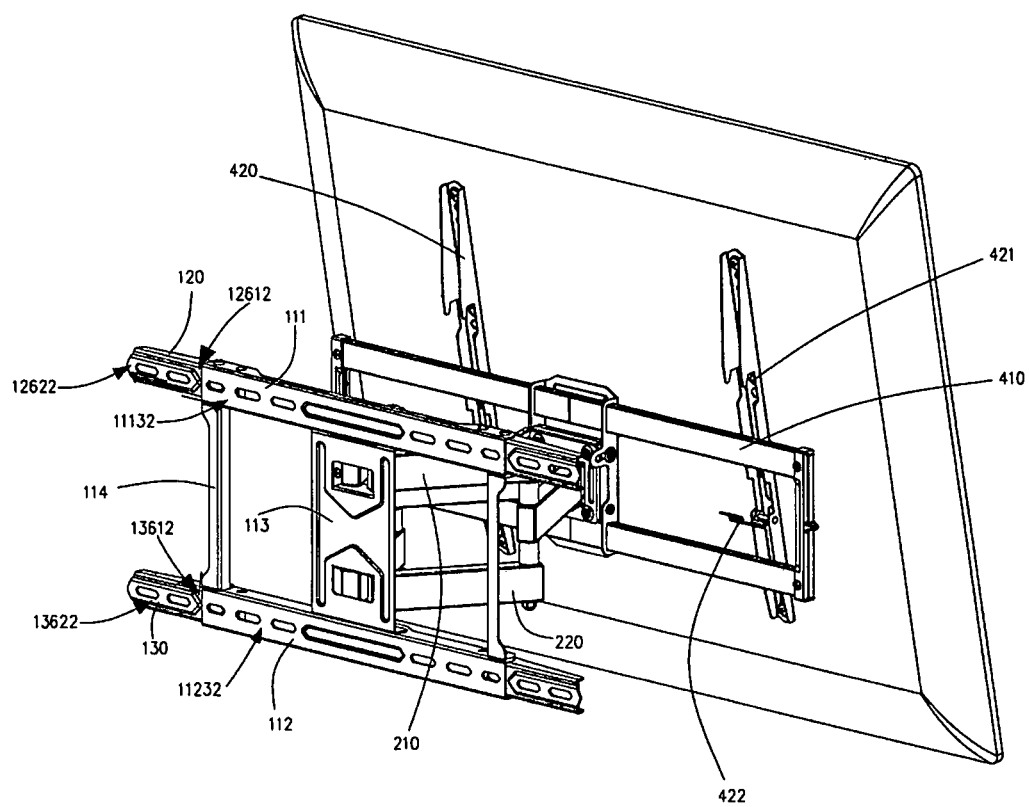
FIG. 3 is a schematic view of a use of the display mounting device of FIG. 1.
Figure 4:
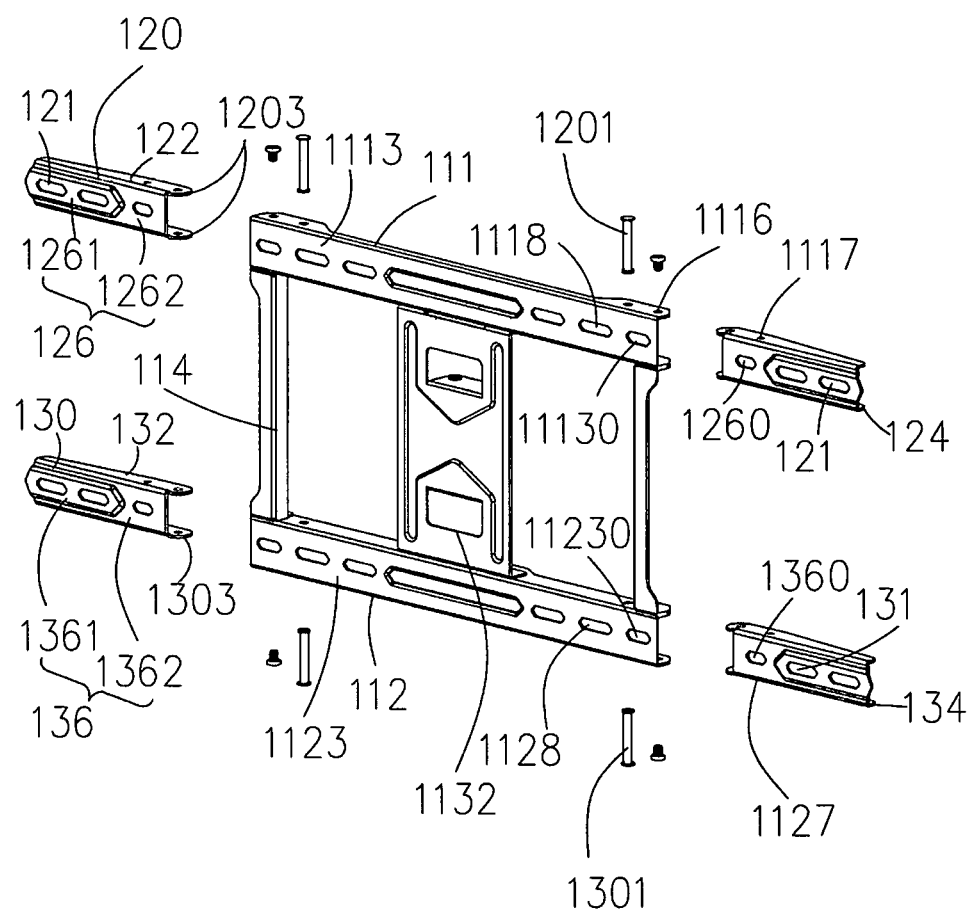
FIG. 4 is an enlarged view of a wall panel of the display mounting device of FIG. 1.

As illustrated in FIG. 1, FIG. 2, FIG. 3, and FIG. 4, the present disclosure provides a display mounting device 1000. The display mounting device 1000 includes a wall panel 100, an expansion hinge connection rod assembly 200, an adapter bracket 300, and a display bracket 400. The wall panel 100 includes a main frame 110, two upper extension rods 120, and two lower extension rods 130. The main frame 110 includes an upper beam 111, a lower beam 112 arranged opposite to the lower beam 112, and a bearing plate 113 fixed between the lower beam 112 and the lower beam 112. The two upper extension rods 120 are respectively rotatably coupled to two ends of the upper beam 111 to allow the two lower extension rods to be unfolded or folded relative to upper beam 111. Each of the two upper extension rods 120 defines an upper mounting hole 121. The upper mounting hole 121 is configured for a screw passing through to allow the two upper extension rods 120 to be fixed to a wall or a load bearing column. The lower extension rods 130 are respectively rotatably coupled to two ends of the lower beam 112 to allow the two lower extension rods to be unfolded or folded relative to the lower beam 112. Each of the two lower extension rods 130 defines a lower mounting hole 131. The lower mounting hole 131 is configured for a screw passing through to allow the two lower extension rods 130 to be fixed to the wall or the load bearing column One end of the expansion hinge connection rod assembly 200 is coupled to the bearing plate 113. The adapter bracket 300 is coupled to one end of the expansion hinge connection rod assembly 200 far away from the bearing plate 113. The display bracket 400 is coupled to the adapter bracket 300 to allow the display bracket to expand and contract relative to the wall panel 100 along with the adapter bracket 300 and the expansion hinge connection rod assembly 200.

It can be understood that, the wall panel 100 can be fixed on a wall surface of a wall, can also be fixed on a wall surface of a load bearing column, can also be fixed on a cabinet of a decorative cabinet, or can also be fixed on a wall surface of a decorative wall panel. A display can be fixedly installed on the display bracket 400. The display can be an electronic device with a display function, such as a flat-panel television, a liquid crystal display, a tablet computer, a display terminal.

The main frame 110 includes the upper beam 111, the lower beam 112 arranged opposite to the upper beam 111, and the bearing plate 113 fixed between the upper beam 111 and the lower beam 112. The two upper extension rods 120 are respectively rotatably coupled to the two ends of the upper beam 111. Each of the two upper extension rods 120 defines the upper mounting hole 121. The lower extension rods 130 are respectively rotatably coupled to the two ends of the lower beam 112. Each of the two lower extension rods 130 defines the lower mounting hole 131. Therefore, the upper extension rods 120 and the lower extension rods 130 can be folded respectively relative to the upper beam 111 and the lower beam 112, meeting requirements of packaging size. The upper extension rods 120 and the lower extension rods 130 can be unfolded respectively relative to the upper beam 111 and the lower beam 112, thus meeting requirements of installation size. The display mounting device 1000 solves problems of difficulty in installation and packaging.

In the embodiment, the main frame 110 is substantially a rectangular frame structure. The main frame 110 further includes two vertical rods 114 fixedly coupled between the upper beam 111 and the lower beam 112. Each of the two vertical rods 114 is respectively fixedly coupled to ends of the upper beam 111 and the lower beam 112. A position where the upper extension rod 120 is rotatingly coupled to the upper beam 111 is staggered from a position where the vertical rod 114 is fixedly coupled to the upper beam 111, thus avoiding a force concentrated on the upper beam 111, and thereby increasing the service life of the main frame 110. A position where the lower extension rod 120 is rotatingly coupled to the lower beam 112 is staggered from a position where the vertical rod 114 is fixedly coupled to the lower beam 112, thus avoiding a force concentrated on the lower beam 112, and thereby increasing the service life of the main frame 110.

In the embodiment, two upper rotating shafts 1201 of the two upper extension rods 120 rotatably coupled to the upper beam 111 are separated from the upper beam 111 and the bearing plate 113. An extension direction of two upper rotating shafts 1201 of the two upper extension rods 120 is substantially perpendicular to an extension direction of the upper beam 111, and is substantially parallel to an extension direction of the bearing plate 113. The two upper extension rods 120 are rotatably coupled to the upper beam 111 by the two upper rotating shafts 1201. When the two upper extension rods 120 are unfolded relative to the upper beam 111, a long rod extending in a straight line is formed by the upper beam 111 and the two upper extension rods 120, thus increasing an installation size of the wall panel 100. Fasteners, such as screws, bolts, pins, can pass through the upper mounting holes 121 of the two upper extension rods 120, to allow the two upper extension rods 120 to be fixed to the wall by, so that the wall panel 100 provides a bearing platform for the display bracket 400. Each of the two upper extension rods 120 may be provided with a plurality of upper mounting holes 121 arranged at equal intervals along a length direction of thereof, thus increasing a form of a mounting structure of the upper extension rod 120. Two lower rotating shafts 1301 of the two lower extension rods 130 rotatably coupled to the lower beam 112 are separated from the lower beam 112 and the bearing plate 113. An extension direction of two lower rotating shafts 1301 of the two lower extension rods 130 is substantially perpendicular to an extension direction of the lower beam 112, and is substantially parallel to an extension direction of the bearing plate 113. The two lower extension rods 130 are rotatably coupled to the lower beam 112 by the two rotating shafts 1301. When the two lower extension rods 130 are unfolded relative to the lower beam 112, a long rod extending in a straight line is formed by the lower beam 112 and the two lower extension rods 130, thus increasing an installation size of the wall panel 100. Fasteners, such as screws, bolts, pins, can pass through the lower mounting holes 131 of two lower extension rods 130, to allow the two lower extension rods 130 to be fixed to the wall by, so that the wall panel 100 provides a bearing platform for the display bracket 400. Each of the two lower extension rods 130 may be provided with a plurality of lower mounting holes 131 arranged at equal intervals along a length direction of thereof, thus increasing a form of a mounting structure of two lower extension rods 130. The upper beam 111, the lower beam 112, the two upper extension rods 120, and the two lower extension rods 130 are all made of steel, thus increasing the structural stability of the wall panel 100.

In the embodiment, two ends of the bearing plate 113 are respectively fixed to a middle part of the upper beam 111 and a middle part of the lower beam 112. The bearing plate 113 provides bearing capacity for the expansion hinge connection rod assembly 200, so that the expansion hinge connection rod assembly 200 can drive the adapter bracket 300 and the display bracket 400 to allow the display bracket to expand and contract relative to the wall panel 100. The bearing plate 113 is made of steel. The bearing plate 113 may be welded to the upper beam 111 and the lower beam 112.

Furthermore, the upper beam 111 includes a first upper side plate 1111, a second upper side plate 1112 arranged opposite to the first upper side plate 1111, and an upper fixing plate 1113 coupled to the first upper side plate 1111 and the second upper side plate 1112. The two upper rotating shafts 1201 of the two upper extension rods 120 are separated from the upper fixing plate 1113, and are rotatably coupled between the first upper side plate 1111 and the second upper side plate 1112. An extension direction of each of two upper rotating shafts 1201 of the two upper extension rods 120 is perpendicular to an extension direction of the upper fixing plate 1113. The two upper extension rods 120 can be completely received between the first upper side plate 1111 and the second upper side plate 1112 to achieve a superposition of the two upper extension rods 120 and the upper beam 111.

In the embodiment, the first upper side plate 1111, the second upper side plate 1112, and the upper fixing plate 1113 are made in one piece. The first upper side plate 1111, the second upper side plate 1112 and the upper fixing plate 1113 may be formed by a bending process. The first upper side plate 1111 and the second upper side plate 1112 are bent relative to the upper fixing plate 1113. The first upper side plate 1111 and the second upper side plate 1112 are substantially perpendicular to the upper fixing plate 1113. The upper fixing plate 1113 is separated from the bearing plate 113. The first upper side plate 1111 and the second upper side plate 1112 are respectively provided with a first upper groove 1114 and a second upper groove 1115, thus reducing an overall weight of the upper beam 111 and reducing the cost. The two upper extension rods 120 are rotatably coupled to ends of the first upper side plate 1111 and rotatably coupled to ends of the second upper side plate 1112. That is, each of the two upper extension rods 120 is rotatably coupled to an end of the first upper side plate 1111 and an end of the second upper side plate 1112. The first upper side plate 1111 is provided with two first fixing holes 1116 at two positions closer to two ends of the first upper side plate 1111. That is, each of the two first fixing holes 1116 is defined at a position closer to each of the two ends of the first upper side plate 1111. Each of the two first fixing holes 1116 can be configured for a screw 1202 passing through. Each of the two upper extension rods 120 is rotatably coupled to the upper beam 111 by an upper rotating shaft 1201. The upper rotating shaft 1201 passes through the first upper side plate 1111 and the second upper side plate 1112. Each of the two upper extension rods 120 defines an upper threaded hole 1117 at one side of the upper rotating shaft 1201. When the two upper extension rods 120 is unfolded relative to the upper beam 111, the screw 1202 passes through the first fixing hole 1116, and is screwed to the upper threaded hole 1117, so that the upper extension rod 120 is fixed to the upper beam 111 to meet the requirements of stable installation performance of the wall panel 100.

In the embodiment, the upper fixing plate 1113 is provided with an upper fixing hole 1118, and the upper fixing hole 1118 is configured for a screw passing through to allow the upper fixing plate 1113 to be fixed to the wall or the load bearing column, thus increasing the structural stability of the wall panel 100 and the wall. The upper fixing plate 1113 may be provided with a plurality of upper fixing holes 1118 arranged at intervals along a length direction of upper fixing plate 1113. The plurality of upper fixing holes 1118 may be in an oval racetrack shape, to facilitate adjustment of the installation size of the upper fixing plate 1113. The upper fixing plate 1113 is also provided with an upper punching boss 1119, thus increasing the structural stability of the upper beam 111.

Furthermore, the lower beam 112 includes a first lower side plate 1121, a second lower side plate 1122 opposite to the first lower side plate 1121, and a lower fixing plate 1123 coupled to the first lower side plate 1121 and the second lower side plate 1122. The two lower rotating shafts 1301 of the two lower extension rods 130 are separated from the lower fixing plate 1123, and are rotatably coupled between the first lower side plate 1121 and the second lower side plate 1122. An extension direction of each of two lower rotating shafts 1301 of the two lower extension rods 130 is perpendicular to an extension direction of the lower fixing plate 1123. The two lower extension rods 130 can be completely received between the first lower side plate 1121 and the second lower side plate 1122 to achieve a superposition of the two lower extension rods 130 and the lower beam 112.

In the embodiment, the first lower side plate 1121, the second lower side plate 1122, and the lower fixing plate 1123 are made in one piece. The first lower side plate 1121, the second lower side plate 1122 and the lower fixing plate 1123 may be formed by a bending process. The first lower side plate 1121 and the second lower side plate 1122 are bent relative to the lower fixing plate 1123. The first lower side plate 1121 and the second lower side plate 1122 are substantially perpendicular to the lower fixing plate 1123. The lower fixing plate 1123 is separated from the bearing plate 113. The first lower side plate 1121 and the second lower side plate 1122 are respectively provided with a first lower groove 1124 and a second lower groove 1125, thus reducing an overall weight of the lower beam 112 and reducing the cost. The two lower extension rods 130 are rotatably coupled to ends of the first lower side plate 1121 and rotatably coupled to ends of the second lower side plate 1122. That is, each of the two lower extension rods 130 is rotatably coupled to an end of the first lower side plate 1121 and an end of the second lower side plate 1122. Each of the two lower extension rods 130 is rotatably coupled to the lower beam 112 by a lower rotating shaft 1301. The lower rotating shaft 1301 passes through the first lower side plate 1121 and the second lower side plate 1122. The first lower side plate 1121 is provided with two second fixing holes 1126 at two positions closer to two ends of the first lower side plate 1121. That is, each of the two second fixing holes 1126 is defined at a position closer to each of the two ends of the first lower side plate 1121. Each of the two second fixing holes 1116 can be configured for a screw 1302 passing through. Each of the two lower extension rods 130 defines a lower threaded hole 1127 at one side of the lower rotating shaft 1301. When the two lower extension rods 130 is unfolded relative to the lower beam 112, the screw 1302 passes through the second fixing hole 1126, and is screwed to the lower threaded hole 1127, so that the lower extension rod 130 is fixed relative to the lower beam 112 to meet the requirements of stable installation performance of the wall panel 100.

In the embodiment, the lower fixing plate 1123 is provided with a lower fixing hole 1128, and the lower fixing hole 1128 is configured for a screw passing through to allow the lower fixing plate 1123 to be fixed to the wall or the load bearing column, thus increasing the structural stability of the wall panel 100 and the wall. The lower fixing plate 1123 may be provided with a plurality of lower fixing holes 1128 arranged at intervals along a length direction of lower fixing plate 1123. The plurality of lowers 1128 may be in an oval racetrack shape, to facilitate adjustment of the installation size of the lower fixing plate 1123. The lower fixing plate 1123 is also provided with a lower punching boss 1129, thus increasing the structural stability of the lower beam 112.

Each of the two upper extension rods 120 includes a first upper side wall 122, a second upper side wall 124 arranged opposite to the first upper side wall 122, and an upper fixing wall 126 coupled to the first upper side wall 122 and the second upper side wall 124. The first upper side wall 122 and the second upper side wall 124 are bent relative to the upper fixing wall 126. One end of each of the two upper extension rods 120 far away from the upper beam 111 is configured as a free end, and the other end of each of the two upper extension rods 120 adjacent to the upper beam 111 arrange two first protrusions 1203. The two first protrusions 1203 are arranged face-to-face. The two first protrusions 1203 protrude out of the first upper side wall 122 and the second upper side wall 124, respectively. The two first protrusions 1203 are substantially configured as semicircle arc configurations, thus reducing a friction between the two upper extension rods 120 and the upper beam 111, and thereby facilitating a rotation of the two upper extension rods 120 relative to the upper beam 111.

The upper threaded hole 1117 is arranged on the first upper side wall 122 or the second upper side wall 124. In other embodiment, the first upper side wall 122 defines a first upper threaded hole, and the second upper side wall 124 defines a second upper threaded hole. The upper threaded hole 1117 is different from the upper mounting hole 121. Such that the two upper extension rods 120 can be firmly fixed to the upper beam 111.

A distance between the two first fixing holes 1116 is great than a distance between the two upper rotating shafts 1201 of the two upper extension rods 120. When the two upper extension rods 120 are unfolded relative to the upper beam 111, a distance between the two upper threaded holes 1117 of the two upper extension rods 120 is substantially equal to the distance between the two first fixing holes 1116, and is great than a distance between the two upper rotating shafts 1201 of the two upper extension rods 120, thus ensuring an enough activity space for the two upper extension rods 120 to rotate relative to the upper beam 111. Such that the two upper extension rods 120 may have a larger rotation angle relative to the upper beam 112.

The upper mounting hole 121 is defined on the upper fixing wall 126. One side of the upper fixing wall 126 adjacent the upper beam 111 define an upper through hole 1260. The upper fixing plate 1113 defines two upper openings 11130. The two upper openings 11130 are located at two sides of the upper fixing plate 1113 adjacent to the two upper extension rods 120. When the two upper extension rods 120 are unfolded relative to the upper beam 111, the upper through hole 1260 is aligned with one of the two upper openings 11130 for a screw passing through to allow the each of the two upper extension rods 120 and the upper beam 111 to be fixed to the wall or the load bearing column, thus meeting the requirements of stable installation performance of the wall panel 100. A length of the upper through hole 1260 is smaller than a length of the upper mounting hole 121, the length of the upper through hole 1260 is substantially equal a length of each of the two upper openings 11130, thus ensuring an enough activity space for the two upper extension rods 120 to rotate relative to the upper beam 111. Such that the two upper extension rods 120 and the upper beam 111 can be firmly fixed to the wall or the load bearing column, and the two upper extension rods 120 may have a larger rotation angle relative to the upper beam 111.

The upper fixing wall 126 includes an upper connecting portion 1261 and an upper stopping portion 1262. The upper stopping portion 1262 protrudes from the upper connecting portion 1261. When the two upper extension rods 120 are unfolded relative to the upper beam 111, the upper connecting portion 1261 is inserted to the upper beam 111, and the upper stopping portion 1262 is stopped by the upper beam 111. Such that the two upper extension rods 120 are exposed outside of the upper beam 111 to facilitate the user to assemble and disassemble two upper extension rods 120, and thereby improving assembly efficiency. Therefore, during the assembly of two upper extension rods 120 and the wall panel 100, the upper stopping portion 1262 can prevent two upper extension rods 120 from sliding completely into the upper beam 111, which causes a problem that assembly is impossible.

The upper connecting portion 1261 includes an inside surface 12611 and an outside surface 12612 opposite to the inside surface 12611. The upper stopping portion 1262 includes an inside surface 12621 and an outside surface 12622 opposite to the inside surface 12621. The upper fixing plate 1113 includes an inside surface 11131 and an outside surface 11132 opposite to the inside surface 11131. The outside surface 12612 of the upper connecting portion 1261 is noncoplanar with the outside surface 12622 of the upper stopping portion 1262. That is, the outside surface 12612 of the upper connecting portion 1261 and the outside surface 12622 of the upper stopping portion 1262 are located at different planes. When the two upper extension rods 120 are unfolded relative to the upper beam 111, the outside surface 12612 of the upper connecting portion 1261 is abutted on the inside surface 11131 of the upper fixing plate 1113, and the outside surface 12622 of the upper stopping portion 1262 is coplanar with the outside surface 11131 of the upper fixing plate 1113, thus improving the flatness of the wall panel 100, and thereby further increasing the structural stability of the wall panel 100 and the wall.

The inside surface 12611 of the upper connecting portion 1261 is noncoplanar with the inside surface 12621 of the upper stopping portion 1262. That is, the inside surface 12612 of the upper connecting portion 1261 and the inside surface 12622 of the upper stopping portion 1262 are located at different planes. A transitional surface 1263 is formed between the inside surface 12612 of the upper connecting portion 1261 and the inside surface 12622 of the upper stopping portion 1262.

One side of the upper fixing wall 126 opposite to the upper stopping portion 1262 defines a first receiving groove 1264. The first receiving groove 1264 corresponds to the upper stopping portion 1262. The inside surface 12622 and the shape of the transitional surface 1263 are cooperatively define the first receiving groove 1264. When the two upper extension rods 120 are folded relative to the upper beam 111, the upper punching boss 1119 is received in the first receiving groove 1264, and the upper punching boss 1119 is abutted on the inside surface 12612, thus achieving a superposition of the two upper extension rods 120 and the upper beam 111, and reducing the overall size of the wall panel 100.

A width of the first upper side wall 122 gradually decreases along a length of the first upper side wall 122. A width of one end of the first upper side wall 122 adjacent to the upper beam 111 is substantially larger than a width of the other end of the first upper side wall 122 far away from the upper beam 111. Such that when the two upper extension rods 120 are unfolded relative to the upper beam 111, a space occupied by the two upper extension rods 120 can be reduced, and an overall weight and the cost of the wall panel 100 can be reduced.

A width of the second upper side wall 124 gradually decreases along a length of the second upper side wall 124. A width of one end of the second upper side wall 124 adjacent to the upper beam 111 is substantially larger than a width of the other end of the second upper side wall 124 far away from the upper beam 111. Such that when the two upper extension rods 120 are unfolded relative to the upper beam 111, a space occupied by the two upper extension rods 120 can be reduced. In addition, an overall weight and the cost of the wall panel 100 can be reduced.

Each of the two lower extension rods 130 includes a first lower side wall 132, a second lower side wall 134 arranged opposite to the first lower side wall 132, and a lower fixing wall 136 coupled to the first lower side wall 132 and the second lower side wall 134. The first lower side wall 132 and the second lower side wall 134 are bent relative to the lower fixing wall 136. One end of each of the two lower extension rods 130 far away from the lower beam 112 is configured as a free end, and the other end of each of the two lower extension rods 130 adjacent to the lower beam 112 arrange two second protrusions 1203. The two second protrusions 1203 are arranged face-to-face. The two second protrusions 1203 protrude out of the first lower side wall 132 and the second lower side wall 134, respectively. The two second protrusions 1203 are substantially configured as semicircle arc configurations, thus reducing a friction between the two lower extension rods 130 and the lower beam 112, and thereby facilitating a rotation of the two lower extension rods 130 relative to the lower beam 112.

The lower threaded hole 1127 is arranged on the first lower side wall 132 or the second lower side wall 134. In other embodiment, the first lower side wall 132 defines a first upper threaded hole, and the second lower side wall 134 defines a second upper threaded hole. The lower threaded hole 1127 is different from the lower mounting hole 131. Such that the two lower extension rods 130 can be firmly fixed to the lower beam 112.

A distance between the two second fixing holes 1126 is great than a distance between the two lower rotating shafts 1301 of the two lower extension rods 130. When the two lower extension rods 130 are unfolded relative to the lower beam 112, a distance between the two lower threaded holes 1127 of the two lower extension rods 130 is substantially equal to the distance between the two second fixing holes 1126, and is great than a distance between the two lower rotating shafts 1301 of the two lower extension rods 130, thus ensuring an enough activity space for the two lower extension rods 130 to rotate relative to the lower beam 112. Such that the two lower extension rods 130 may have a larger rotation angle relative to the lower beam 112.

The lower mounting hole 131 is defined on the lower fixing wall 136. One side of the lower fixing wall 136 adjacent the lower beam 112 define a lower through hole 1360. The lower fixing plate 1123 defines two lower openings 11230. The two lower openings 11230 are located at two sides of the lower fixing plate 1123 adjacent to the two lower extension rods 130. When the two lower extension rods 130 are unfolded relative to the lower beam 112, the lower through hole 1360 is aligned with one of the two lower openings 11230 for a screw passing through to allow the each of the two lower extension rods 130 and the lower beam 112 to be fixed to the wall or the load bearing column, thus meeting the requirements of stable installation performance of the wall panel 100. A length of the lower through hole 1360 is smaller than a length of the lower mounting hole 131, the length of the lower through hole 1360 is substantially equal a length of each of the two lower openings 11230, thus ensuring an enough activity space for the two lower extension rods 130 to rotate relative to the lower beam 112. Such that the two lower extension rods 130 and the lower beam 112 can be firmly fixed to the wall or the load bearing column, and the two lower extension rods 130 may have a larger rotation angle relative to the lower beam 112.

Each of the two lower rotating shafts 1301 is located between adjacent the lower opening 11230 and the lower fixing hole 1128, thus avoiding installation interference between the screw and the lower rotating shaft 1301, and thereby achieving a fixed connection between the two lower extension rods 130 and the wall or the load bearing column.

The lower fixing wall 136 includes a lower connecting portion 1361 and a lower stopping portion 1362. The lower stopping portion 1362 protrudes from the lower connecting portion 1361. When the two lower extension rods 130 are unfolded relative to the lower beam 112, the lower connecting portion 1361 is inserted to the lower beam 112, and the lower stopping portion 1362 is stopped by the lower beam 112. Such that the two lower extension rods 130 are exposed outside of the lower beam 112 to facilitate the user to assemble and disassemble two lower extension rods 130, and thereby improving assembly efficiency. Therefore, during the assembly of two lower extension rods 130 and the wall panel 100, the lower stopping portion 1362 can prevent two lower extension rods 130 from sliding completely into the lower beam 112, which causes a problem that assembly is impossible.

The lower connecting portion 1361 includes an inside surface 13611 and an outside surface 13612 opposite to the inside surface 13611. The lower stopping portion 1362 includes an inside surface 13621 and an outside surface 13622 opposite to the inside surface 13621. The lower fixing plate 1123 includes an inside surface 11231 and an outside surface 11232 opposite to the inside surface 11231. The outside surface 13612 of the lower connecting portion 1361 is noncoplanar with the outside surface 13622 of the lower stopping portion 1362. That is, the outside surface 13612 of the lower connecting portion 1361 and the outside surface 13622 of the lower stopping portion 1362 are located at different planes. When the two lower extension rods 130 are unfolded relative to the lower beam 112, the outside surface 13612 of the lower connecting portion 1361 is abutted on the inside surface 11231 of the lower fixing plate 1123, and the outside surface 13622 of the lower stopping portion 1362 is coplanar with the outside surface 11232 of the lower fixing plate 1123, thus improving the flatness of the wall panel 100, and thereby further increasing the structural stability of the wall panel 100 and the wall.

The inside surface 13611 of the lower connecting portion 1361 is noncoplanar with the inside surface 13621 of the lower stopping portion 1362. That is, the inside surface 12612 of the lower connecting portion 1361 and the inside surface 12622 of the lower stopping portion 1362 are located at different planes. A lower transitional surface 1263 is formed between the inside surface 12612 of the lower connecting portion 1361 and the inside surface 12622 of the lower stopping portion 1362.

One side of the lower fixing wall 136 opposite to the lower stopping portion 1362 defines a second receiving groove 1364. The second receiving groove 1364 corresponds to the lower stopping portion 1362. The inside surface 13622 and the shape of the transitional surface 1363 are cooperatively define the second receiving groove 1364. When the two lower extension rods 130 are folded relative to the lower beam 112, the lower punching boss 1129 is received in the second receiving groove 1364, and the lower punching boss 1129 is abutted on the inside surface 13612, thus achieving a superposition of the two lower extension rods 130 and the lower beam 112, and reducing the overall size of the wall panel 100.

A width of the first lower side wall 132 gradually decreases along a length of the first lower side wall 132. A width of one end of the first lower side wall 132 adjacent to the lower beam 112 is substantially larger than a width of the other end of the first lower side wall 132 far away from the lower beam 112. Such that when the two lower extension rods 130 are unfolded relative to the lower beam 112, a space occupied by the two lower extension rods 130 can be reduced, and an overall weight and the cost of the wall panel 100 can be reduced.

A width of the second lower side wall 134 gradually decreases along a length of the second lower side wall 134. A width of one end of the second lower side wall 134 adjacent to the lower beam 112 is substantially larger than a width of the other end of the second lower side wall 134 far away from the lower beam 112. Such that when the two lower extension rods 130 are unfolded relative to the lower beam 112, a space occupied by the two lower extension rods 130 can be reduced. In addition, an overall weight and the cost of the wall panel 100 can be reduced.

Furthermore, a length of the upper beam 111 and a length of the lower beam 112 are substantially less than 60 centimeters (cm). A width of the wall panel 100 is substantially less than 40 cm. The lengths of the upper beam 111 and the lower beam 112 are substantially less than 60 cm, such that the overall size of the display mounting device 1000 can meet the requirements of a packaging size with a length of 60 cm. A size of an outer edge of the upper beam 111 to an outer edge of the lower beam 112 is less than 40 cm, that is, a width of the wall panel 100 is less than 40 cm, such that the overall size of the display mounting device 1000 can meet the requirements of a packaging size with a width of 40 cm. When the two upper extension rods 120 and the two lower extension rods 130 are unfolded relative to the main frame 110, a distance between the two upper mounting holes 121 is substantially greater than 80 cm, and a distance between the two lower mounting holes 131 is substantially greater than 80 cm, thus meeting the requirements of the wall panel 100 installed and fixed to two load bearing columns at a standard distance of 80 cm, and thereby meeting the requirements of the display installation device 1000 applying to more usage scenarios.

Furthermore, the bearing plate 113 is provided with a first bearing portion 1131 and a second bearing portion 1132 arranged opposite to the first bearing portion 1131. The expansion hinge connection rod assembly 200 includes two first forward rotating rods 210, two second front rotation rods 220, and two rear rotation rods 230. The two first front rotation rods 210 are rotatably coupled to the first bearing portion 1131, and the two second front rotation rods 220 are rotatably coupled to the second bearing portion 1132. One end of each of the two rear rotation rods 230 is rotatably coupled between each of the two first front rotation rods 210 and each of the two second front rotation rods 220. The adapter bracket 300 is rotatably coupled to an end of each of the two rear rotating rods 230 far away from the wall panel 100.

In the embodiment, the first bearing portion 1131 is provided with a first supporting plate. The two first front rotating rods 210 are rotatably coupled between the first supporting plate and the upper beam 111. The two first front rotation rods 210 are rotatably coupled between the first supporting plate and the second upper side plate 1112. The first supporting plate is substantially perpendicular to the bearing plate 113. The first supporting plate is substantially parallel to the upper beam 111. The bearing plate 113 defines a first through hole 1133 adjacent to the first supporting plate, thus facilitating the forming of the first supporting plate, and reducing a weight of the wall panel 100.

In the embodiment, the second bearing portion 1132 is provided with a second supporting plate. The two second front rotating rods 220 are rotatably coupled between the second supporting plate and the lower beam 112. The second front rotating rods 220 are rotatably coupled between the second supporting plate and the second lower side plate 1122. The second supporting plate is substantially perpendicular to the bearing plate 113. The second supporting plate is substantially parallel to the lower beam 112. The bearing plate 113 define a second through hole 1134 adjacent to the second supporting plate, thus facilitating the forming of the second supporting plate, and reducing a weight of the wall panel 100.

Furthermore, the expansion hinge connection rod assembly 200 further includes a first plastic spacer 211, a second plastic spacer 221, and an intermediate rotating shaft 240. The rear rotating rod 230 is separated from the first front rotating rod 210 by the first plastic spacer 211. The rear rotating rod 230 is separated from the second front rotating rod 220 by the second plastic spacer 221. The intermediate rotating shaft 240 passes through the first front rotating rod 210, the first plastic spacer 211, the rear rotating rod 230, the second plastic spacer 221, and the second front rotating rod 220 in turn. In the embodiment, the expansion hinge connection rod assembly 200 further includes two first plastic spacers 211, two second plastic spacers 221, and two intermediate rotating shafts 240. One of the two rear rotating rods 230 is separated from one of the two first front rotating rods 210 by one of the two first plastic spacers 211, and the other of the two rear rotating rods 230 is separated from one of the two second front rotating rods 220 by one of the two second plastic spacers 221. One of the two intermediate rotating shafts 240 passes through one of the two first front rotating rods 210, one of the two first plastic spacers 211, one of the two rear rotating rods 230, one of the two second plastic spacers 221, and one of the two second front rotating rods 220 in turn.

In the embodiment, two ends of the first plastic spacer 211 abut against the first front rotating rod 210 and the rear rotating rod 230, thus increasing a distance between the first front rotating rod 210 and the rear rotating rod 230, and reducing a rotational friction between the first front rotating rod 210 and the rear rotating rod 230. Two ends of the second plastic spacer 221 abut against the second front rotating rod 220 and the rear rotating rod 230, thus increasing a distance between the second front rotating rod 220 and the rear rotating rod 230, and reducing a rotational friction between the second front rotating rod 220 and the rear rotating rod 230.

Furthermore, the first front rotating rod 210 is configured as a hollow tubular structure. The second front rotating rod 220 is configured as a hollow tubular structure. The expansion hinge connection rod assembly 200 further includes a first intermediate pipe plug 212 and a second intermediate pipe plug 222. The first intermediate pipe plug 212 and the second intermediate pipe plug 222 are respectively inserted into one end of the first front rotating rod 210 and one end of the second front rotating rod 220. The intermediate rotating shaft 240 further passes through the first intermediate pipe plug 212 and the second intermediate pipe plug 222. The first intermediate pipe plug 212 and the second intermediate pipe plug 222 strengthen the structural strength of the ends of the first front rotating rod 210 and the end of the second front rotating rod 220, respectively. Such that the first front rotating rod 210 and the second front rotating rod 220 are firmly rotatably coupled to the rear rotating rod 230. The first front rotating rod 210 and the second front rotating rod 220 are configured as hollow tubular structures, thus reducing a weight and cost of the display mounting device 1000.

In the embodiment, the expansion hinge connection rod assembly 200 further includes a first front pipe plug 213, a second front pipe plug 223, a first front rotating shaft 214, and a second front rotating shaft 224. The first front pipe plug 213 and the second front pipe plug 223 are respectively inserted into an end of the first front rotating rod 210 and an end of the second front rotating rod 220. The first front rotating shaft 214 passing through the end of the first front rotating rod 210 and the first front pipe plug 213 is rotatably coupled to the first bearing portion 1131. The second front rotating shaft 224 passing through the end of the second front rotating rod 220 and the second front pipe plug 223 is rotatably coupled to the second bearing portion 1132. The first front pipe plug 213 and the second front pipe plug 223 strengthen the structural strength of the ends of the first front rotating rod 210 and the end of the second front rotating rod 220, respectively. The first front rotating rod 210 and the second front rotating rod 220 can be firmly rotatably coupled to the rear rotating rod 230, and the bearing performance of the display mounting device 1000 can be improved.

Furthermore, the expansion hinge connection rod assembly 200 further includes a rear pipe plug 231 and a rear rotating shaft 232. The rear rotating rod 230 is configured as a hollow tubular structure. The rear pipe plug 231 is inserted into an end of the rear rotating rod 230 far away from the wall panel 100. The rear rotating shaft 232 passes through the end of the rear rotating rod 230 and the rear pipe plug 231. The rear rotating shaft 232 is rotatably coupled to the adapter bracket 300. The expansion hinge connection rod assembly 200 further includes an intermediate rear pipe plug 233. The intermediate rear pipe plug 233 is inserted into an end of the rear rotating rod 230 far away from the adapter bracket 300. The intermediate rotating shaft 240 passes through the intermediate rear pipe plug 233. The rear pipe plug 231 and the intermediate rear pipe plug 233 respectively strengthen the structural strength of the opposite ends of the rear rotating rod 230, thus increasing the structural stability of the expansion hinge connection rod assembly 200.

Furthermore, the adapter bracket 300 includes a rotation pedestal rotatably 310 coupled to the rear rotating rod 230 and a tilt pedestal 320 rotatably coupled to the rotation pedestal 310. A rotation direction of the rotation pedestal 310 relative to the rear rotating rod 230 is parallel to a rotation direction of the rear rotating rod 230 relative to the first front rotating rod 210. A rotation direction of the tilt pedestal 320 relative to the rotation pedestal 310 is perpendicular to a rotation direction of the rotation pedestal 310 relative to the rear rotating rod 230. The display bracket 400 is fixed to the tilt pedestal 320.

In the embodiment, the rotation pedestal 310 is provided with a bearing plate 311 and an adjusting plate 312 fixedly connected to the bearing plate 311. The bearing plate 311 is provided with a rotating plate 313. The bearing plate 311 can be fixed to the adjusting plate 312 by screws. The bearing plate 311 is substantially parallel to the wall panel 100. The r rotating plate 313 is substantially perpendicular to the wall panel 100. The rotating plate 313 and the bearing plate 311 are made in one piece. The rear rotating shaft 232 passes through the rear rotating rod 230 and the rotating plate 313 to allow the rotation pedestal 310 to rotate relative to the rear rotating rod 230. One side of the adjusting plate 312 facing away from the rotating plate 313 is provided with a tilt adjustment end 314 and a tilt rotation end 315 opposite to the tilt adjustment end 314. The tilt adjustment end 314 is located at an upper part of the rotation pedestal 310, and the tilting rotating end 315 is located at the lower part of the rotation pedestal 310. The tilt pedestal 320 is provided with a rotation connection portion 321 rotatably coupled to the tilt rotation end 315 and a sliding connection portion 322 slidably coupled to the tilt adjustment end 314. The adapter bracket 300 further includes a tilt adjustment bolt 330. The tilt adjustment bolt 330 passes through the tilt adjustment end 314 of the rotation pedestal 310 and the sliding connection portion 322 of the tilt pedestal 320 to stabilize a rotating angle of the tilt pedestal 320 relative to the rotation pedestal 310. The tilt pedestal 320 can rotate around the tilt rotation end 315 to allow the sliding connection portion 322 to slide relative to the tilt adjustment end 314. The tilt adjustment bolt 330 can adjust the angle of the tilt pedestal 320 relative to the rotation pedestal 310, thus achieving an adjustment of an angle of the display bracket 400 relative to the wall panel 100.

Furthermore, the display bracket 400 includes a fixed frame 410 and two hanging bars 420 mounted on the fixed frame 410. The fixed frame 410 is fixed on the adapter bracket 300. The two hanging bars 420 are capable of being fixed on a back of a display.

In the embodiment, the fixed frame 410 includes an upper fixed rod 411, a lower fixed rod 412 arranged opposite to the upper fixed rod 411, and two side fixing rods 413 fixed between the upper fixed rod 411 and the lower fixed rod 412. The upper fixing rod 411 and the lower fixing rod 412 are respectively fixed to upper and lower ends of the tilt pedestal 320. The upper fixing rod 411 is formed by two upper splicing rods. The lower fixing rod 412 is formed by two lower splicing rods. The hanging bar 420 can be mounted on the upper fixing rod 411 and the lower fixing rod 412, such that the display can be mounted on the fixed frame 410 along with the hanging bar 420. The display can be unfolded and folded with the display bracket 400 relative to the wall panel 100, can be rotated at an angle in a horizontal direction, and can be adjusted to an angle in a vertical direction. Each of the two hanging bars 420 is provided with a hook 421 mounted on the upper fixing rod 411 and a rotating buckle 422 fastened to the lower fixing rod 412, thus achieving a stability of the two hanging bars 420 relative to the fixed frame 410.

The main frame 110 includes the upper beam 111, the lower beam 112 arranged opposite to the upper beam 111, and the bearing plate 113 fixed between the upper beam 111 and the lower beam 112. The two upper extension rods 120 are respectively rotatably coupled to the two ends of the upper beam 111. Each of the two upper extension rods 120 defines the upper mounting hole 121. The lower extension rods 130 are respectively rotatably coupled to the two ends of the lower beam 112. Each of the two lower extension rods 130 defines the lower mounting hole 131. Therefore, the upper extension rods 120 and the lower extension rods 130 can be folded respectively relative to the upper beam 111 and the lower beam 112, meeting requirements of packaging size. The upper extension rods 120 and the lower extension rods 130 can be unfolded respectively relative to the upper beam 111 and the lower beam 112, thus meeting requirements of installation size. The display mounting device 1000 solves problems of difficulty in installation and packaging.

The present disclosure has been described in detail above. The above is only the preferable embodiment of the present disclosure, the scope of the present disclosure is not limited to thereof. That is, equivalent changes made in the claims of the present disclosure are still within the scope of the present disclosure.

What is claimed is:

1. A display mounting device, comprising a wall panel, an expansion hinge connection rod assembly, an adapter bracket, and a display bracket;
   the wall panel comprises a main frame, two upper extension rods, and two lower extension rods;
   the main frame comprises an upper beam, a lower beam arranged opposite to the upper beam, and a bearing plate fixed between the upper beam and the lower beam; the two upper extension rods are respectively rotatably coupled to two ends of the upper beam to allow the two upper extension rods to be unfolded or folded relative to the upper beam;
   each of the two upper extension rods defines an upper mounting hole; the upper mounting hole is configured for a screw passing through to allow the two upper extension rods to be fixed to a wall or a load bearing column;
   the two lower extension rods are respectively rotatably coupled to two ends of the lower beam to allow the two lower extension rods to be unfolded or folded relative to the lower beam; each of the two lower extension rods defines a lower mounting hole; the lower mounting hole is configured for a screw passing through to allow the two lower extension rods to be fixed to the wall or the load bearing column;
   one end of the expansion hinge connection rod assembly adjacent to the bearing plate is coupled to the bearing plate;
   the adapter bracket is coupled to an another end of the expansion hinge connection rod assembly far away from the bearing plate;
   the display bracket is coupled to the adapter bracket to allow the display bracket to expand and contract relative to the wall panel along with the adapter bracket and the expansion hinge connection rod assembly.

2. The display mounting device of claim 1, wherein
   the upper beam comprises a first upper side plate, a second upper side plate arranged opposite to the first upper side plate, and an upper fixing plate coupled between the first upper side plate and the second upper side plate;
   two upper rotating shafts respectively coupled to the two upper extension rods are separated from the upper fixing plate, and are rotatably coupled between the first upper side plate and the second upper side plate;
   an extension direction of the upper rotating shaft of each of the two upper extension rods is perpendicular to an extension direction of the upper fixing plate;
   the two upper extension rods are capable of receiving between the first upper side plate and the second upper side plate completely to achieve a superposition of the two upper extension rods and the upper beam;
   the lower beam comprises a first lower side plate, a second lower side plate arranged opposite to the first lower side plate, and a lower fixing plate coupled between the first lower side plate and the second lower side plate;
   two lower rotating shafts respectively coupled to the two lower extension rods are separated from the lower fixing plate, and are rotatably coupled between the first lower side plate and the second lower side plate;
   an extension direction of the lower rotating shaft of each of the two lower extension rods is perpendicular to an extension direction of the lower fixing plate;
   the two lower extension rods are capable of receiving between the first lower side plate and the second lower side plate completely to achieve a superposition of the two lower extension rods and the lower beam.

3. The display mounting device of claim 2, wherein
   the upper fixing plate defines an upper fixing hole; the upper fixing hole is configured for a screw passing through to allow the upper fixing plate to be capable of being fixed on the wall or the load bearing column;
   the lower fixing plate defines a lower fixing hole; the lower fixing hole is configured for a screw passing through to allow the lower fixing plate to be capable of being fixed on the wall or the load bearing column.

4. The display mounting device of claim 2, wherein one end of each of the two upper extension rods far away from the upper beam is configured as a free end, and an another end of each of the two upper extension rods adjacent to the upper beam arrange two first protrusions; the two first protrusions are arranged face-to-face;
   one end of each of the two lower extension rods far away from the lower beam is configured as a free end, and an another end of each of the two lower extension rods adjacent to the lower beam arrange two second protrusions.

5. The display mounting device of claim 4, wherein each of the two upper extension rods comprises a first upper side wall, a second upper side wall arranged opposite to the first upper side wall, and an upper fixing wall coupled to the first upper side wall and the second upper side wall; the two first protrusions protrude out of the first upper side wall and the second upper side wall, respectively;
   each of the two lower extension rods includes a first lower side wall, a second lower side wall arranged opposite to the first lower side wall, and a lower fixing wall coupled to the first lower side wall and the second lower side wall; the two second protrusions protrude out of the first lower side wall and the second lower side wall, respectively.

6. The display mounting device of claim 5, wherein the first upper side wall and the second upper side wall are bent relative to the upper fixing wall;
   the first lower side wall and the second lower side wall are bent relative to the lower fixing wall; two ends of the upper rotating shaft of each of the two upper extension rods are rotatably coupled to the first upper side wall and the second upper side wall;
   two ends of the lower rotating shaft of each of the two lower extension rods are rotatably coupled to the first lower side wall and the second lower side wall.

7. The display mounting device of claim 5, wherein the first upper side wall of each of the two upper extension rods defines an upper threaded hole; the first upper side plate defines two first fixing holes; a screw passing through one of the two first fixing holes is screwed to the upper threaded hole, so that each of the two upper extension rods is fixed to the upper beam;

the first lower side wall of each of the two lower extension rods defines a lower threaded hole; the first lower side plate defines two second fixing holes; a screw passing through one of the two second fixing holes is screwed to the lower threaded hole, so that each of the two lower extension rods is fixed to the lower beam.

8. The display mounting device of claim 7, wherein a distance between the two first fixing holes is great than a distance between the two upper rotating shafts respectively coupled to the two upper extension rods;

a distance between the two second fixing holes is great than a distance between the two lower rotating shafts respectively coupled to the two lower extension rods.

9. The display mounting device of claim 5, wherein the upper fixing wall includes an upper connecting portion and an upper stopping portion;

the upper stopping portion protrudes from the upper connecting portion; when the two upper extension rods are unfolded relative to the upper beam, the upper connecting portion is inserted to the upper beam, and the upper stopping portion is stopped by the upper beam;

the lower fixing wall includes a lower connecting portion and a lower stopping portion;

the lower stopping portion protrudes from the lower connecting portion; when the two lower extension rods are unfolded relative to the lower beam, the lower connecting portion is inserted to the lower beam, and the lower stopping portion is stopped by the lower beam.

10. The display mounting device of claim 9, wherein when the two upper extension rods are unfolded relative to the upper beam, an outside surface of the upper connecting portion is abutted on an inside surface of the upper fixing plate, and an outside surface of the upper stopping portion is coplanar with an outside surface of the upper fixing plate;

when the two lower extension rods are unfolded relative to the lower beam, an outside surface of the lower connecting portion is abutted on an inside surface of the lower fixing plate, and an outside surface of the lower stopping portion is coplanar with an outside surface of the lower fixing plate.

11. The display mounting device of claim 9, wherein one side of the upper fixing wall opposite to the upper stopping portion defines a first receiving groove; the upper fixing plate is provided with an upper punching boss;

when the two upper extension rods are folded relative to the upper beam, the upper punching boss is received in the first receiving groove;

one side of the lower fixing wall opposite to the lower stopping portion defines a second receiving groove; the lower fixing plate is provided with a lower punching boss;

when the two upper extension rods are folded relative to the upper beam, the lower punching boss is received in the second receiving groove.

12. The display mounting device of claim 5, wherein one side of the upper fixing wall adjacent the upper beam define an upper through hole; the upper fixing plate defines two upper openings;

when the two upper extension rods are unfolded relative to the upper beam, the upper through hole is aligned with one of the two upper openings for a screw passing through to allow the each of the two upper extension rods and the upper beam to be fixed to the wall or the load bearing column;

one side of the lower fixing wall adjacent the lower beam define a lower through hole; the lower fixing plate defines two lower openings;

when the two lower extension rods are unfolded relative to the lower beam, the lower through hole is aligned with one of the two lower openings for a screw passing through to allow the each of the two lower extension rods and the lower beam to be fixed to the wall or the load bearing column.

13. The display mounting device of claim 12, wherein a length of the upper through hole is smaller than a length of the upper mounting hole and is substantially equal a length of each of the two upper openings;

a length of the lower through hole is smaller than a length of the lower mounting hole and is substantially equal a length of each of the two lower openings.

14. The display mounting device of claim 4, wherein the two first protrusions and the two second protrusions are substantially configured as semicircle arc configurations.

15. The display mounting device of claim 4, wherein two ends of the upper rotating shaft of each of the two upper extension rods are rotatably coupled to the two first protrusions;

two ends of the lower rotating shaft of each of the two lower extension rods are rotatably coupled to the two second protrusions.

16. The display mounting device of claim 1, wherein a length of the upper beam and a length of the lower beam are substantially less than 60 cm; a width of the wall panel is substantially less than 40 cm;

when the two upper extension rods and the two lower extension rods are unfolded relative to the main frame, a distance between two upper mounting holes defined on the two upper extension rods respectively is substantially greater than 80 cm, and a distance between two lower mounting holes defined on the two lower extension rods respectively is substantially greater than 80 cm.

17. The display mounting device of claim 1, wherein the main frame further includes two vertical rods fixedly coupled between the upper beam and the lower beam;

each of the two vertical rods is respectively fixedly coupled to ends of the upper beam and the lower beam;

positions where the two upper extension rods are rotatingly coupled to the upper beam are staggered from positions where the two vertical rods are fixedly coupled to the upper beam;

positions where the two lower extension rods are rotatingly coupled to the lower beam are staggered from positions where the two vertical rods are fixedly coupled to the lower beam.

18. The display mounting device of claim 1, wherein the bearing plate is provided with a first bearing portion and a second bearing portion arranged opposite to the first bearing portion;

the expansion hinge connection rod assembly comprises two first front rotating rods, two second front rotating rods, and two rear rotating rods;

the two first front rotating rods are rotatably coupled to the first bearing portion, the two second front rotating rods are rotatably coupled to the second bearing portion, one end of each of the two rear rotating rods is rotatably coupled between each of the two first front rotating rods and each of the two second front rotating rods; the adapter bracket is rotatably coupled to an another end of each of the two rear rotating rods far away from the wall panel.

19. The display mounting device of claim 18, wherein the expansion hinge connection rod assembly further comprises a first plastic spacer, a second plastic spacer, and an intermediate rotating shaft;
- a respective rear rotating rod is separated from a respective first front rotating rod by the first plastic spacer;
- the respective rear rotating rod is separated from a respective second front rotating rod by the second plastic spacer,
- the intermediate rotating shaft passes through the respective first front rotating rod, the first plastic spacer, the respective rear rotating rod, the second plastic spacer, and the respective second front rotating rod in turn.

20. The display mounting device of claim 19, wherein
each of the two first front rotating rods is configured as a hollow tubular structure;
each of the two second front rotating rods is configured as a hollow tubular structure;
the expansion hinge connection rod assembly further comprises a first intermediate pipe plug and a second intermediate pipe plug;
- the first intermediate pipe plug and the second intermediate pipe plug are respectively inserted into an end of the respective first front rotating rod far away from the bearing plate and an end of the respective second front rotating rod far away from the bearing plate;
- the intermediate rotating shaft further passes through the first intermediate pipe plug and the second intermediate pipe plug.

* * * * *